Patented Apr. 10, 1951

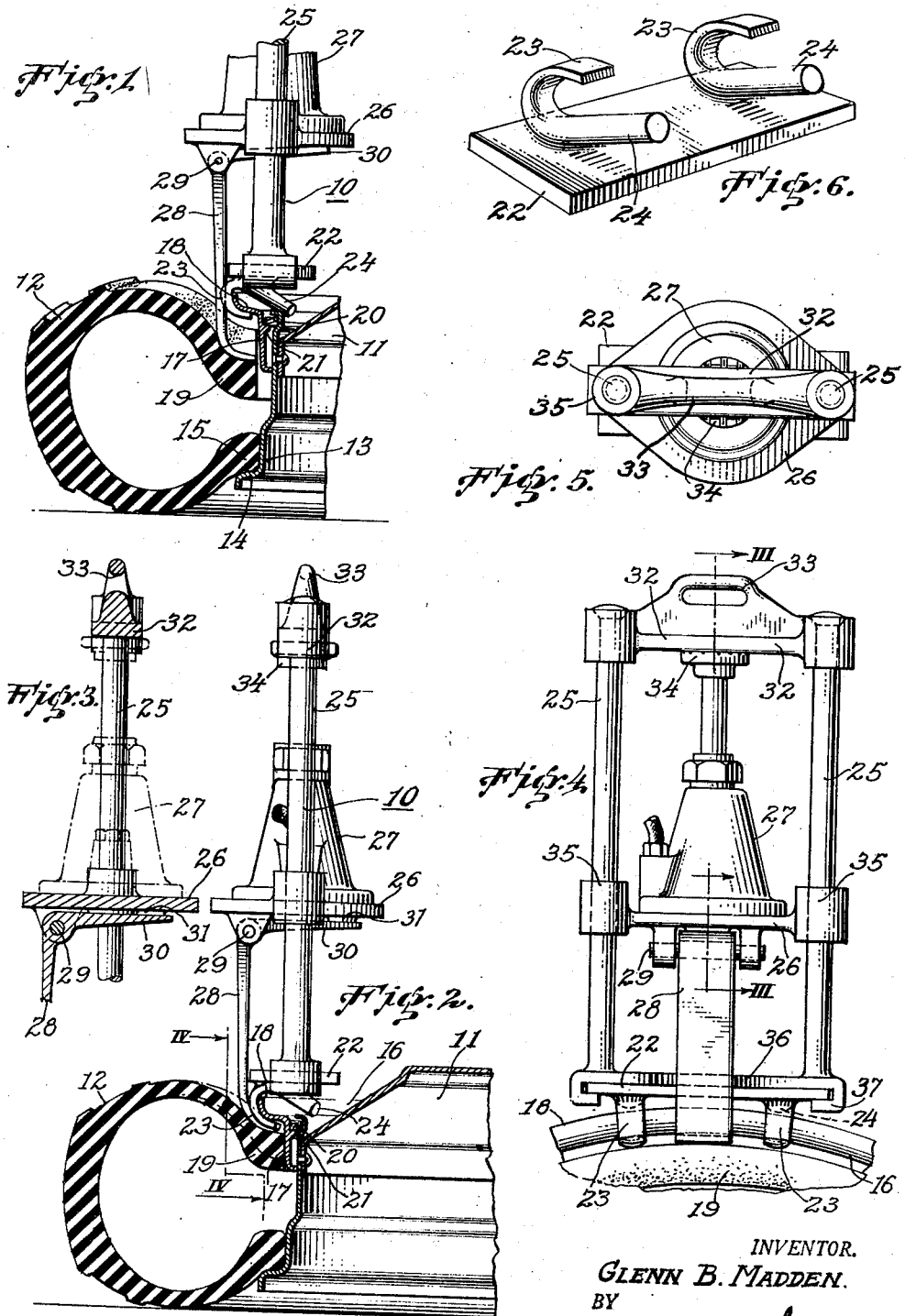

2,548,033

UNITED STATES PATENT OFFICE 2,548,033

AXIALLY SHIFTING TYPE JACK OPERATED TIRE REMOVING DEVICE

Glenn B. Madden, San Francisco, Calif.

Application April 28, 1947, Serial No. 744,335

2 Claims. (Cl. 157—1.17)

My present invention relates to tire removing tools and more particularly to a tire tool which will be found particularly adapted for removing heavy duty tires that are mounted and used with a removable bead supporting rim such as is provided on trucks and the like.

An object of the invention is to provide a tire releasing tool by which the outer wall and bead of a tire may be displaced from the rim of a wheel in a new and novel manner.

Another object of the invention is to provide a tire releasing tool for use upon a wheel having a split ring retained removable rim and in which the rim operates as a support for substantially the entire inner facing upon the bead of a tire.

Another object of the invention is to provide a tire upsetting tool which may be used with a jack and operated to force the bead of a tire from an inwardly movable flanged tire retaining rim of the type which is keyed against outward movement upon a tire carrying wheel.

Another object of the invention is to provide an improved tire casing displacing tool by which a force producing means such as a jack may be employed to exert a force between the wall of a tire casing and the retaining flange of a wheel.

Other objects and advantages of my invention will be in part evident to those skilled in the art and in part pointed out in connection with the accompanying drawing, wherein there is shown by way of illustration and not of limitation a preferred embodiment of the invention.

In the drawing;

Figure 1 is a fragmentary side view, partially in section, showing a tool constructed in accordance with a preferred embodiment of the invention and in one condition of operation, Figure 2 is a view similar to Figure 1 showing the tool as mounted upon a tire wheel and in another condition of operation, Figure 3 is a fragmentary sectional view taken along line III—III of Figure 4, Figure 4 is a front view of my improved tool in the condition as shown in Figure 2 of the drawing, Figure 5 is a plan view of the tool as shown in Figure 4, and Figure 6 is a perspective view showing a detail of the invention.

While the tool contemplated by my present invention will be found applicable to many different forms of tire mountings it, as has been hereinabove indicated, will be found particularly adapted for use in the demounting of wide base tires from those wheels of the type more recently developed in which the outer bead of the tire is carried entirely by a free floating removable rim portion which is held against outward displacement due to an inflation of an inner tube within the tire by means of a split retaining ring which encircles the wheel and serves to lock the removable rim against outward movement when the tire is in use.

In the drawing, my improved tire tool designated broadly by the numeral 10, is shown as positioned upon a wheel 11 which is provided with a wide base tire 12. In this particular construction the wheel 11 has an inside bead supporting portion 13 with a flange 14 upon and against which the inside bead 15 of the tire 12 is seated. At the other side of the wheel there is a removable rim forming member 16 which has a bead supporting portion 17 that is similar to the portion 13 at the other side of the wheel and as a continuation of this bead supporting portion 17 the rim forming member 16 has an outwardly extending flange 18 which in cooperation with the rim supporting portion 17 serves to retain an outside bead 19 of the tire 12 upon the wheel 11 when the tire is fully inflated. The rim forming member 16 is supported upon the wheel 11 in a removable manner and when in use it will be retained upon the wheel 11 by means of a split retaining ring 20 in a manner which is well understood in the art. In this particular instance the removable rim forming member 16 has an annular inwardly extending abutment 21 with which the split retaining ring 20 engages.

The problem of removing a tire such as the tire 12 from the wheel 11 is often complicated by the fact that the beads 15 and 19 become seized upon the bead supporting portions of the wheel 11. This is particularly true where one of the beads of the tire engages with a floating or removable rim 16 such as is here illustrated. The problem of breaking the attachment of the tire 12 therefrom is made more difficult because of the fact that when the tire is deflated the removable rim member 16 will be free to move inwardly and thus follow the bead 19 whenever any attempt is made to separate these parts. This difficulty is overcome with my improved tool by the provision of a special form of jack supporting means which will serve to exert a spreading force between the removable rim forming member 16 and the bead of the tire 19 while at the same time it will serve to prevent an inward movement of the removable rim member 16. To accomplish this my improved tool includes a combined rim and wheel engaging member 22 that has integrally formed rim encircling hooks 23 and wheel engaging extensions 24 which when placed upon the wheel, as here shown, will serve to provide a mounting for a jack or other force exerting means. In this instance the member 22 is shown as engaged by a yoke-like structure 25 upon which a base forming portion 26 is slidably mounted. This base forming portion 26 serves to accommodate the base of a jack 27 and depending from its underside there is a pressure exerting arm 28 which is hingedly mounted at one side of the axis of the yoke 25 by means of a pin 29. This arm 28 also has a right angled extension 30 which is adapted to engage the underside of the base forming portion 26 and thus limit its inward swinging movement. In this particular instance the tool 10 is shown as extended and in the condition it will assume when the bead 19 has been entirely broken away from the removable rim 16.

In Figure 2 of the drawing the tool 10 with its yoke 25 and the jack 27 is shown in its entirety and in its retracted condition. At the upper end of the yoke 25 there is a bridging member 32 which has a grip or handle 33 by which the tool might be carried from one job to another and from one position to another as it is advanced around the perimeter of a wheel to complete a breaking of a bead from the removable rim member 16. The jack 27, here chosen for illustration, is of the hydraulic type and its piston end 34 is positioned to engage with the bridging member 32 at the upper end of the yoke 25. In this view it will be noted that when the tool 10 is applied to the wheel 11 the hook forming portions 23 of the member 22 will be passed around the flange 18 of the removable rim 16 and the lower end of the depending member 28 which is curved to conform with the outer wall of the tire 12 will be extended into the space thus provided between the flange 18 and the bead 19 of the tire. At the same time the wheel engaging portions 24 of the member 22 will contact with the rim retaining flange of the wheel 11. Then by the application of force through the operation of the jack 27 the bead 19 of the tire 12 will be caused to move relative to the removable rim member 16 and be thus broken free therefrom, while at the same time the removable rim member 16 will be held against inward displacement from its normal position upon the wheel. This operation will be repeated in a step by step manner as the tool is moved around the perimeter of the wheel 11.

As shown in Figure 3 of the drawing the right angled extension 30 of the depending arm 28 is adapted to contact with a surface forming pad 31 which is provided upon the underside of the movable base 26 and in this way the inward swinging movement of the depending arm 28 will be limited to a position where it will exert a straight line force upon the outer wall of the tire 12 when the jack 27 is operated.

Upon referring to Figure 4 of the drawing it will be noted that the yoke 25 of the tool 10 comprises two vertical rods of cylindrical cross section which are arranged in spaced parallel relation so that the base forming portion may be slidably mounted thereupon by collars or bearings 35 which are carried thereby. At its lower end the vertical members of the yoke 25 are connected by a web portion 36 which has downwardly and inwardly extending flanges 37 at each of its sides that are adapted to pass around the ends of the member 22 upon which the rim encircling hooks 23 are mounted. At the lower end of this figure of the drawing the tire 12 is broken away along the line IV—IV of Figure 2, so as to expose the outwardly extending flange 18 of the rim forming member 16 and show the bead 19 of the tire in section. As here viewed, it will be noted that the rim encircling hooks 23 of the wheel engaging member 22 are arranged to overhang the circular outwardly extending flange 18 in spaced relation and provide a space therebetween in which the pressure exerting arm 28 may operate upon the bead 19 of the tire 12. By referring to Figure 5 of the drawing it will be seen that in plan the tool 10 is of substantially symmetrical form and this therefore renders the tool easily transportable from one position to another about the tire by the handle or grip 23 at the upper end thereof.

Upon now referring to Figure 6 of the drawing it will be seen that the wheel engaging member 22 comprises a substantially rectangular plate upon which the two rim encircling hooks 23 and the wheel engaging members 24 are welded in spaced relation. In this connection it should be stated that the tool 10 will be provided with a series or plurality of these wheel engaging members 22, each of which will differ somewhat in the shape and/or curvature of the rim encircling hooks and the angle and length of the wheel engaging extensions may also vary to accommodate wheel rims of different diameters and configurations. When so equipped the tool 10 will be found applicable to practically all standard wheel and tire combinations.

It is believed that the operation of my device will be clearly understood from the above. Therefore, it should only be necessary to add that in applying my tool 10 to a job the operator will first with an ordinary tire tool or pry bar loosen the tire wall at one side for a limited distance at its bead and this only sufficiently to permit the insertion of the rim encircling hooks about the rim, after which the pressure exerting arm 28 may be easily swung counterclockwise and into the position illustrated in Figure 2 of the drawing. Then with the jack 27 in place, as here shown, an operation of the jack will cause the base forming portion 26 to move downwardly toward the wheel 11 and thus cause the pressure exerting arm 28 to exert an inwardly applied force which will break the bead 19 of the tire 12 away from the removable rim 16 while at the same time the wheel engaging extensions 24 of the wheel engaging member 22 will bear against the snap ring retaining flange of the wheel 11 and hold the removable rim 16 against inward movement. During this operation the tire casing will be broken away from the rim 16 for a limited distance at each side of the tool 10 and by retracting the jack 27 and moving the tool 10 to another point about the wheel it will be possible to again repeat this operation until the outside bead 19 of the tire has been completely released from the removable rim 16, after which, the removal of the tool and the wheel engaging member 22 from the wheel will permit the rim 16 to drop free of the tire 12 and the wheel 11, where the split ring 20 may be removed to permit a final removal of the rim 16 from the wheel. During these operations it will be understood that because of the off center the pivotal mounting of the pressure exerting arm 28 the application of a force by the jack 27 will tend to cause a clockwise rotation of the tool 10 toward the center of the wheel 11 and in this way the wheel engaging extension 24 of the member 22 will be firmly held in contact with the split ring retaining flange of the wheel 11. At the same time an outward pressure will be exerted upon the removable rim 16 by the rim encircling hooks 23 which will tend to hold this rim 16 firmly against the split ring 20 as the bead 19 of the tire 12 is moved inwardly with relation thereto.

While I have, for the sake of clearness and in order to disclose the invention so that the same can be readily understood, described and illustrated a specific device and arrangement, I desire to have it understood that this invention is not limited to the specific means disclosed, but may be embodied in other forms that will suggest themselves to persons skilled in the art. It is believed that this invention is new and all such changes as come within the scope of the appended claims are to be considered as part of this invention.

Having thus described my invention, what I claim and desire to secure by Letters Patent is:

1. In a tire removing tool for unseating the bead of a wide base tire from a wheel having a removable rim, the combination of a rim engaging member having spaced rim encircling clips with integrally formed wheel engaging portions adapted to be positioned at a point upon the wheel with its clips encircling a portion of the removable rim, a yoke-like member adapted to be supported by said rim engaging member and extend outwardly at a right angle to the plane of the wheel and tire, a base forming member movably mounted upon said yoke-like member, an arm pivotally mounted upon said base forming member at one side of the center of said yoke-like member having its outer end extended inwardly to engage with the bead of a tire within the radial limits of said removable rim, and a pressure exerting means carried by said base forming member and engaging the outer end of said yoke-like member adapted when operated to exert a force through said pivotally mounted arm and against the wall of said tire at its point of engagement with said rim while said rim is held against movement relative to said wheel by the rim encircling and the integrally formed wheel engaging portions of said rim engaging member.

2. In a tire removing tool for unseating the bead of the wide base tire from a wheel having a split ring retained removable rim, the combination of a plate-like member having spaced rim encircling clips and extending wheel engaging portions adapted to be positioned at a point about the circumference of the wheel with its rim encircling clips engaging the removable rim, a yoke-like member adapted to be supported by said plate-like member and extend outwardly at a right angle to the plane of the wheel, a base forming member slidably mounted upon said yoke, an arm pivotally mounted upon the under side of said base forming member at one side of the center of said yoke-like member having its outer end extended between said rim encircling clips to engage with the bead of a tire at the point where it engages with said removable rim, and a pressure exerting jack carried by said movable base forming member and engaging with the outer end of said yoke adapted to operate through said pivotally mounted arm and exert a displacing force against the wall of said tire while said rim is held against movement relative to said wheel by the clip encircling and wheel engaging portions of said plate-like member.

GLENN B. MADDEN.

REFERENCES CITED

The following references are of record in the file of this patent:

UNITED STATES PATENTS

| Number | Name | Date |
|---|---|---|
| 1,452,596 | De Fernelmont | Apr. 24, 1923 |
| 1,507,208 | Schlenker | Sept. 2, 1924 |
| 1,519,558 | Snider | Dec. 16, 1924 |
| 1,983,608 | Hand | Dec. 11, 1934 |
| 2,122,388 | Wilkerson | June 28, 1938 |
| 2,406,996 | Colley | Sept. 3, 1946 |
| 2,436,003 | Gosselin | Feb. 17, 1948 |